US010528508B2

(12) United States Patent
Levy et al.

(10) Patent No.: US 10,528,508 B2
(45) Date of Patent: Jan. 7, 2020

(54) TECHNOLOGIES FOR FAST MAUSB ENUMERATION

(71) Applicant: Intel IP Corporation, Santa Clara, CA (US)

(72) Inventors: Elad Levy, Rishon le Zion (IL); Michael Glik, Kfar Saba (IL); Tal Davidson, Petach Tikva (IL); Daniel Cohn, Raanana (IL)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 15/857,835

(22) Filed: Dec. 29, 2017

(65) Prior Publication Data

US 2019/0042504 A1 Feb. 7, 2019

(51) Int. Cl.
*G06F 13/38* (2006.01)
*G06F 13/42* (2006.01)
*G06F 13/10* (2006.01)

(52) U.S. Cl.
CPC .......... *G06F 13/385* (2013.01); *G06F 13/107* (2013.01); *G06F 13/4282* (2013.01); *G06F 2213/0042* (2013.01)

(58) Field of Classification Search
CPC ............... G06F 13/385; G06F 13/4282; G06F 2213/0042
USPC .......................................................... 710/8
See application file for complete search history.

(56) References Cited

U.S. PATENT DOCUMENTS

| 7,689,755 | B2 * | 3/2010 | Balasubramanian ....................... G06F 9/5061 710/311 |
| 8,909,818 | B2 * | 12/2014 | Manor ................ G06F 11/0745 710/8 |
| 9,037,763 | B2 * | 5/2015 | Huang .................. G06F 13/385 710/63 |
| 2017/0168971 | A1 * | 6/2017 | Glik ....................... G06F 13/385 |
| 2018/0143932 | A1 * | 5/2018 | Lawless .............. G06F 13/4068 |
| 2019/0004819 | A1 * | 1/2019 | Levy ..................... G06F 9/4418 |

OTHER PUBLICATIONS

Media Agnostic USB Specification version 1.0a, dated Jul. 29, 2015, 176 pages.

* cited by examiner

*Primary Examiner* — Brian T Misiura
(74) *Attorney, Agent, or Firm* — Barnes & Thornburg LLP

(57) ABSTRACT

Technologies for improving enumeration of universal serial bus (USB) devices over a media agnostic USB (MAUSB) connection are disclosed. In the illustrative embodiment, an MAUSB device may send USB configuration data to a host compute device. The host compute device may then perform a virtual enumeration of the USB devices based on the USB configuration data without necessarily communicating with the USB devices. The MAUSB device may perform an enumeration of the USB devices on behalf of the host compute devices without necessarily communicating with the host compute device. The USB devices may not be aware or have any indication that the USB device is not communicating with the host compute device during the enumeration process. Such an approach may improve the latency of USB enumeration over an MAUSB connection.

28 Claims, 11 Drawing Sheets

TECHNOLOGIES FOR FAST MAUSB ENUMERATION

BACKGROUND

Compute devices may be connected to several peripheral devices, such as a mouse and a keyboard. Many of these devices, including devices which implement a Universal Serial Bus (USB) interface, are foregoing wired connections in favor of wireless connections. In some cases, a compute device may connect to multiple devices at the same time or in rapid succession, such as when a compute device is connected to docking station.

When a compute device connects to a USB device, an enumeration process takes place to initialize communication. The process of enumerating the various USB devices may take several seconds and impede the use of the USB devices right away. The effect can be compounded when a USB hub is used to further connect multiple USB differences.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
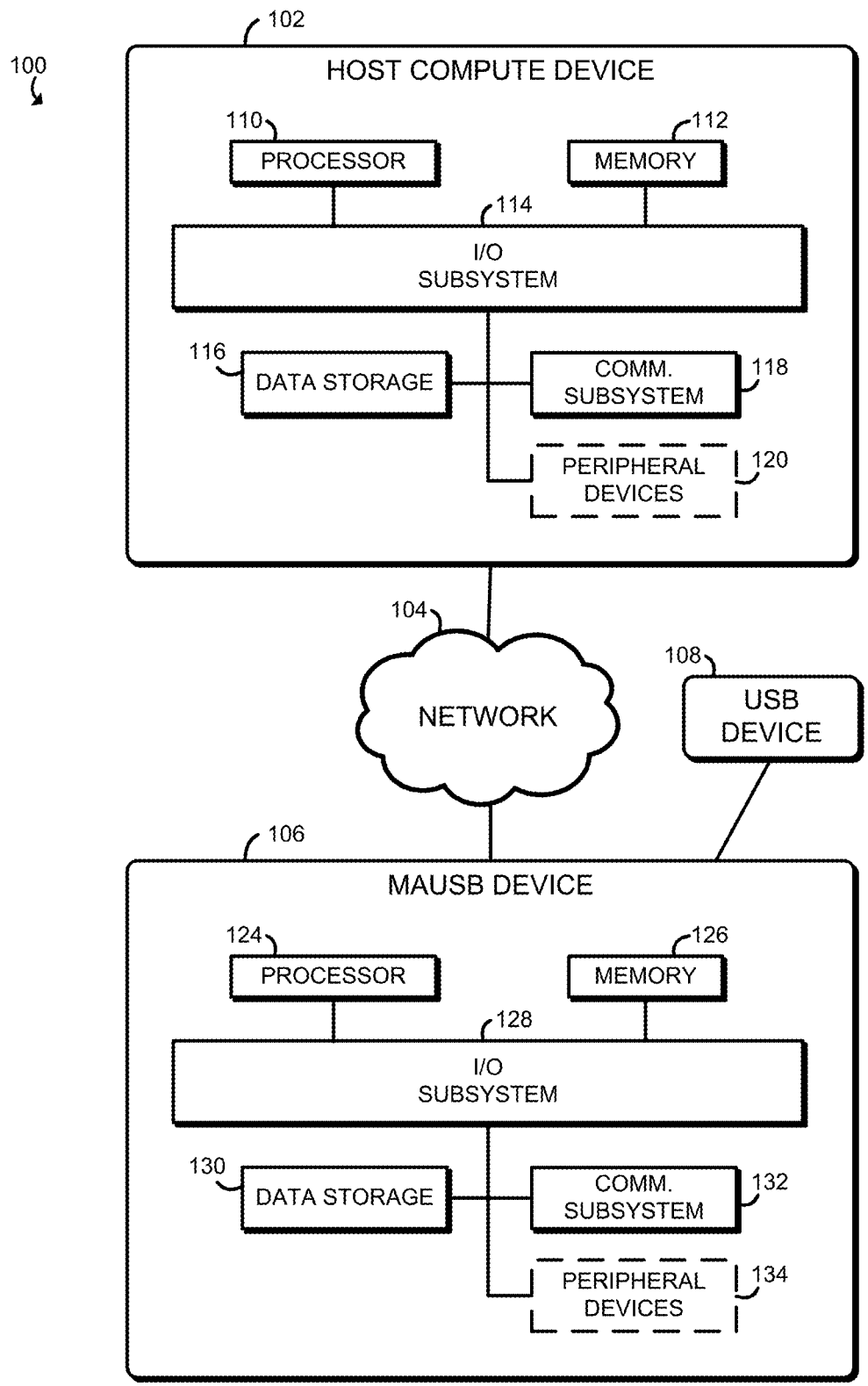
FIG. 1 is a simplified block diagram of at least one embodiment of a system for enumerating media agnostic USB (MAUSB) devices by a host compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for enumerating media agnostic universal serial bus (MAUSB) devices includes a host compute device 102 and a network 104 to connect the host compute device 102 to a MAUSB device 106 which is connected to a universal serial bus (USB) device 108. Although FIG. 1 shows only one host compute device 102, one MAUSB device 106, and one USB device 108, the system 100 may include additional host compute devices 102 and MAUSB devices 106 that may be connected together via the network 104. In addition, the system may include additional USB devices 108 connected to the MAUSB device 106. In use, as described below, a host compute device 102 may establish a wireless link with a MAUSB device 106 and subsequently establish a MAUSB session with the MAUSB device 106. The host compute device 102 may receive USB configuration data of the MAUSB device 106, the USB device 108, and/or other USB devices 108. Additionally or alternatively, in some embodiments, the host compute device 102 may receive a hash of the USB configuration data, which it may use to identify the USB configuration data already stored in the host compute device 102, as discussed in more detail below.

After the host compute device 102 obtains the USB configuration data, the host compute device 102 may perform a virtual enumeration of the connected MAUSB device 106 and/or USB devices 108. In such a virtual enumeration, in the illustrative embodiment, the host compute device 102 may perform the same steps as a typical enumeration, but without actually communicating with the MAUSB device 106 or USB devices 108. Instead, the host compute device 102 may rely on the USB configuration data to determine the expected responses from the MAUSB device 106 or USB devices 108 and react accordingly. The host compute device 102 may take certain steps as part of the virtual enumeration, such as loading suitable USB device drivers.

While the host compute device 102 is performing a virtual enumeration of the MAUSB device 106 and/or the USB devices 108, the MAUSB device 106 may perform an enumeration of the USB devices 108, which may also be based on the USB configuration data. To do so, the illustrative MAUSB device 106 may communicate with the USB devices 108 in the standard manner according to, e.g., pre-defined protocols in order to prepare the USB devices 108 to communicate with the host compute device 102. However, the illustrative MAUSB device 106 may not communicate with the host compute device 102, but rather may anticipate the responses from the host compute device 102 and communicate with the USB devices 108 accordingly. It should be appreciated that such an approach can reduce or eliminate the communication necessary between the MAUSB device 106 and the host compute device 102 that may otherwise be necessary during the enumeration process. Reducing or elimination that communication may significantly improve the enumeration time of the MAUSB device 106 and USB devices 108, leading to an improved user experience. The improvement may be particularly significant when the link between the host compute device 102 and the MAUSB device 106 has a longer latency than there would be with a direct wired connection, such as if the link is embodied as an Ethernet connection.

The host compute device 102 may be embodied as any type of computation or computer device capable of performing the functions described herein, including, without limitation, a computer, a server, a rack-mounted server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the host compute device 102 illustratively includes a processor 110, a memory 112, an input/output (I/O) subsystem 114, a data storage device 116, a communication subsystem 118, and/or other components and devices commonly found in a host computer or similar compute device. Of course, the host compute device 102 may include other or additional components, such as those commonly found in a host computer (e.g., various input/output devices). In some embodiments, the host compute device 102 may include peripheral devices 120. Additionally, in some embodiments, one or more of the illustrative components may be incorporated in, or otherwise form a portion of, another component. For example, the memory 112, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. The memory 112 may be embodied as any type of volatile or non-volatile memory or data storage capable of performing the functions described herein. In operation, the memory 112 may store various data and software used during operation of the compute device 102 such operating systems, applications, programs, libraries, and drivers. The memory 112 is communicatively coupled to the processor 110 via the I/O subsystem 114, which may be embodied as circuitry and/or components to facilitate input/output operations with the processor 110, the memory 112, and other components of the host compute device 102. For example, the I/O subsystem 114 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 112, and other components of the host compute device 102, on a single integrated circuit chip.

The data storage device 116 may be embodied as any type of device or devices configured for short-term or long-term storage of data such as, for example, memory devices and circuits, memory cards, hard disk drives, solid-state drives, non-volatile flash memory, or other data storage devices. The host compute device 102 may also include a communications subsystem 118, which may be embodied as any communication circuit, device, or collection thereof, capable of enabling communications between the host compute device 102 and the MAUSB device over the network 104. For example, the communications subsystem 118 may be embodied as or otherwise include a network interface controller (NIC) for sending and/or receiving network data with remote devices. The communications subsystem 118 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. It should be appreciated that, as described in more detail below, communication between the host compute device 102 and the MAUSB device 106 may be performed with use of the communications subsystem 118.

The host compute device 102 may further include one or more peripheral devices 120. The peripheral devices 120 may include any number of additional input/output devices, interface devices, and/or other peripheral devices. For example, in some embodiments, the peripheral devices 120 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

As shown in FIG. 1, the system 100 includes a network 104. The network 104 may be embodied as any type of network capable of facilitating communications between the host compute device 102 and the MAUSB device 106 and/or other remote devices. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications thereacross. It should be appreciated that, in some embodiments, the host compute device 102 may have a direct connection to the MAUSB device 106, such as through a wired or wireless link without any intermediate devices such as switches.

As shown in FIG. 1, the system 100 includes a MAUSB device 106. The MAUSB device 106 may be embodied as any type of computation or computer device capable of performing the functions described herein, including, without limitation, a computer, a server, a rack-mounted server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. The MAUSB device 106 may be any device capable of implementing a protocol which allows for implementation of a Universal Serial Bus (USB) protocol, such as the USB 3.1 specification released on Jul. 26, 2013, using a physical link other than direct wires from the MAUSB device 106 to the host compute device 102. For example, the MAUSB device 106 may implement a USB protocol over an Ethernet connection, an InfiniBand® connection, a Bluetooth® connection, a Wi-Fi® connection, a WiMAX connection, a 3G connection, a 4G LTE connection, etc. The MAUSB device 106 may implement any suitable protocol or specification to do so, such as the Wireless Universal Serial Bus Specification 1.1, published Sep. 9, 2010, or the Media Agnostic Universal Serial Bus Specification 1.0a, published Jul. 29, 2015. In should be appreciated that the MAUSB device 106 is not limited to implementations such as the Media Agnostic Universal Serial Bus Specification 1.0a which explicitly use the term "media agnostic." In some embodiments, the MAUSB device 106 may be embodied as a MAUSB hub with a full tree of USB devices 108. In other embodiments, the MAUSB device 106 may be embodied as a singular MAUSB device 106 that is linked to the hosts compute device 102. As shown in FIG. 1, the MAUSB device 106 includes a processor 124, a memory 126, an input/output (I/O) subsystem 128, a data storage 130, a communication subsystem 132, and/or other components and devices commonly found in a MAUSB device or similar compute device. Of course the MAUSB device 106 may include other or additional components, such as those commonly found in a MAUSB device (e.g. various input/output devices), in other embodiments. In some embodiments, the MAUSB device 106 may include peripheral devices 134. It should be appreciated that the peripheral devices 134 may be integrated into the MAUSB device 106 and form a core component of the functionality of the MAUSB device 106. For example, the MAUSB device 106 may be embodied as a printer, and the peripheral device 134 may be embodied as the physical component capable of printing ink onto a sheet of paper. In the illustrative embodiment, the MAUSB device 106 includes similar components to the host compute device 102. The components of the MAUSB device 106 are similarly embodied as the components of the host compute device 102. Additionally, in some embodiments, one or more of the illustrative components may be incorporated in, or otherwise form a portion of, another component. For example, the memory 126, or portions thereof, may be incorporated in the processor 124 in some embodiments. Of course, it should be appreciated that, in many embodiments, the processor 124, the memory 126, etc., of the MAUSB device 106 may be less powerful than the corresponding processor 110, the memory 122, etc. in the host compute device 102.

As shown in FIG. 1, the system 100 includes a USB device 108 that is connected to the MAUSB device 106. In other embodiments, there may be any number of USB devices connected to the MAUSB device 106 and/or directly to the host compute device 102. The USB device 108 may be embodied as any USB device capable of performing the functions described herein. In some embodiments, some or all of the USB devices 108 may be MAUSB devices.

Figure 2:
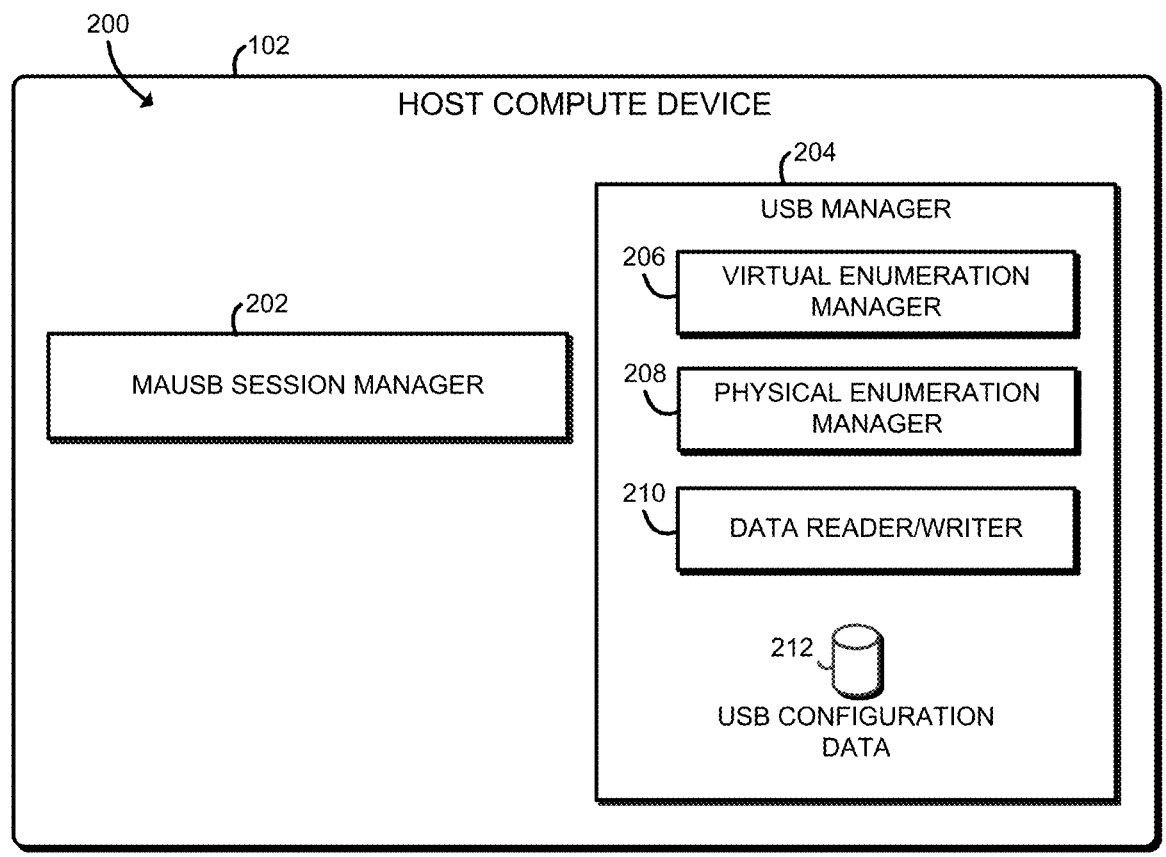
FIG. 2 is a simplified block diagram of at least one embodiment of an environment of a host compute device of FIG. 1.

Referring now to FIG. 2, in an illustrative embodiment, the host compute device 102 may establish an environment 200 during operation. The illustrative environment 200 includes an MAUSB session manager 202 and a USB manager 204. The various components of the environment 200 may be embodied as hardware, firmware, software, or a combination thereof. For example, the various modules, logic, and other components of the environment 200 may form a portion of, or otherwise be established by, the processor 110 or other hardware components of the host compute device 102 such as the memory 112. As such, in some embodiments, one or more of the components of the environment 200 may be embodied as circuitry or collection of electrical devices (e.g., an MAUSB session manager circuit 202, a USB manager circuit 204, etc.). It should be appreciated that, in such embodiments, one or more of the circuit (e.g., the MAUSB session manager 202, the USB manager circuit 204, etc.) may form a portion of the processor 110, the memory 112, the I/O subsystem 114, and/or other components of the host compute device 102. Additionally, in some embodiments, one or more of the illustrative components may form a portion of another component and/or one or more of the illustrative components may be independent of one another. Also, although illustrated as being established by a single host compute device 102, in some embodiments, the environment 200 may be established by several host compute devices 102 in communication over the network 104. Further, in some embodiments, one or more of the components of the environment 200 may be embodied as virtualized hardware components or emulated architecture, which may be established and maintained by the processor 110 or other components of the host compute device 102.

The MAUSB session manager 202 is configured to manage an MAUSB session with the MAUSB device 106. The MAUSB session manager 202 may establish a physical link with the MAUSB device 106. The link may be embodied as any physical connection that allows the host compute device 102 to communicate with the MAUSB device 106, such as a connection over Ethernet, InfiniBand®, Bluetooth®, Wi-Fi®, WiMAX, 3G, 4G LTE, etc. The MAUSB session manager 202 is further configured to establish, manage, and terminate an MAUSB session with the MAUSB device 106 over the physical link established with the MAUSB device 106. The MAUSB session manager 202 may send an initialize session message to the MAUSB device 106 after establishing the link with the MAUSB device 106. The MAUSB session manager 202 may wait for a message confirming receipt of the initialization before completion of the initialization process of the session. Alternatively, the MAUSB session manager 202 may initialize the MAUSB session with the MAUSB device 106 after sending the initialize session message. After the session is established, the MAUSB session manager 202 may facilitate the operation of the MAUSB device 106 by sending and receiving messages. In some embodiments, the MAUSB session manager 202 may be implemented virtually, such as by being hosted on a virtual machine (VM) by one or more compute devices.

The USB manager 204 is configured to establish and maintain a USB session with the MAUSB device 106 and any other USB devices 108 that may be used. In the illustrative embodiment, the USB manager 204 includes a virtual enumeration manager 206, a physical enumeration manager 208, a data reader/writer 210, and USB configuration data 212. In use, the USB manager 204 may receive an indication of USB configuration data of the connected MAUSB device 106 and/or the connected USB devices 108 upon initialization of the MAUSB session. The indication of the USB configuration data may be embodied as USB configuration data itself or as an indication of USB configuration data 212 that may be saved on the host compute device 102, such as a hash of USB configuration data 212 or an index to an entry in a table of USB configuration data 212. If the USB manager 204 receives an indication of USB configuration data it does not recognize, the USB manager 204 may take any suitable action, such as sending an error message to the MAUSB device 106 or requesting the USB configuration data from the MAUSB device 106. The USB configuration data may include information describing some or all of the USB devices connected to the MAUSB device. The USB configuration data may include an entry for each of the USB devices described by the USB configuration data. An entry for a USB device may include information such as device speed, a portion or all of one or more descriptors such as a device descriptor, configuration descriptor, etc., past address assignment, past device configuration, and any other relevant information. In some embodiments, the USB manager 204 may be implemented virtually, such as by being hosted on a VM by one or more compute devices.

The virtual enumeration manager 206 is configured to handle the virtual enumeration of the MAUSB device 106 and/or USB devices 108 for use by host compute device 102. In use, the virtual enumeration manager 206 accesses the USB configuration data indicated by the MAUSB device 106 and performs a virtual enumeration of the USB devices 108 and/or the MAUSB device 106. A virtual enumeration of a USB device is an enumeration in which some or all of the messages that are typically passed between the host and the USB device are not actually passed. As discussed in more detail below in regard to the physical enumeration manager 208, several messages may be passed back and forth between the host and the USB device, which may be required to receive USB configuration information and to follow the expected USB protocol. However, since the host compute device 102 already has the USB configuration data of the connected USB devices 108, the host compute device 102 need not send and receive the messages involved in enumeration but may only be required to configure the host compute device 102 in a similar manner as occurs during the enumeration process. For example, the host compute device 102 may assign each USB device 108 an address and load suitable drivers for each USB device 108. As discussed in more detail below in regard to the environment 300 of the MAUSB device 106, it should be appreciated that the MAUSB device 106 may send and receive the messages associated with enumeration of the USB device 108, and the USB device 108 may not be aware that the enumeration messages are not being sent to or sent by the host compute device 102. After the MAUSB device 106 completes enumeration of the USB devices 108, the MAUSB device 106 may send a message to the host compute device 102 with any relevant information, such as the addresses assigned to the USB devices 108 and any changes in the USB topology or configuration data of the USB devices 108. If the addresses assigned to the USB devices 108 by the MAUSB device 106 are different from the addresses assigned to the USB devices by the virtual enumeration manager 206 during the virtual enumeration process, the virtual enumeration manager 206 may update the addresses before allowing access to the devices by the client, such as an application running on the host compute device 102. If there is a change in the USB topology and/or configuration data, the virtual enumeration manager 206 may, as necessary, change the configuration of the USB devices 108 on the host compute device 102, such as by closing a connection to a USB device 108 that is no longer connected or updating the stored USB configuration data 212.

The physical enumeration manager 208 is configured to manage the physical enumeration of one or more USB devices 108. As described above, the virtual enumeration manager 206 may perform a virtual enumeration of some or all of the connected USB devices 108 at the beginning of the MAUSB session. However, the virtual enumeration manager 206 may not perform a virtual enumeration of all USB devices 108, such as if the USB device 108 is newly connected and not included in the indication of the USB configuration data sent by the MAUSB device 106 or if the USB device 108 is connected after the initial enumeration process has completed. In such cases, the physical enumeration manager 208 may perform the standard enumeration process with messages sent back and forth between the host compute device 102 and the USB device 108. For example, the physical enumeration manager 208 may get device descriptors of the USB device 108, reset the USB device 108, assign an address to the USB device 108, get configuration descriptors from the USB device 108, get interface descriptors from the USB device 108, and load suitable devices drives on the host compute device 102.

The data reader/writer 210 is configured to read and write data to and from the connected MAUSB device 106 and/or USB devices 108. After enumeration is complete, data read and write requests received by the data reader/writer 210 may be performed immediately or soon after being received. However, in some embodiments, the virtual enumeration performed by the host compute device 102 may be completed before the enumeration of the USB devices 108 is completed by the MAUSB device 106. In such embodiments, the USB manager 306 may present the USB devices 108 as connected and ready to send and receive data to clients on the host compute device 102, such as applications running on the host compute device 102. If a client attempts to send or read data on a USB device 108 before the enumeration of the USB devices 108 by the MAUSB device 106 has completed, the data reader/writer 210 may buffer the data read or write request until the enumeration of the USB devices 108 by the MAUSB device 106 is complete, and then send the data read or write request at that point. Additionally or alternatively, in some embodiments, the data reader/writer 210 may send data read or write requests to the MAUSB device 106, and the MAUSB device 106 may buffer the requests as needed.

As described above, the stored USB configuration data 212 may include information describing some or all of the USB devices 108 that the host compute device 102 has previously connected to. The host compute device 102 may, for example, store the USB configuration data 212 of the USB devices 108 associated with the most recent MAUSB session or store the USB configuration data 212 of USB devices 108 the host compute device 102 has connected to in a certain time frame. The USB configuration data 212 may include an entry for each of the USB devices 108. An entry for a USB device 108 may include information such as device speed, a portion or all of one or more descriptors such as a device descriptor, configuration descriptor, etc., past address assignment, past device configuration, and any other relevant information. For example, an entry in the USB configuration data 212 may include some or all of the device descriptor, the configuration descriptor, one or more interface descriptors, and one or more endpoint descriptors.

Figure 3:
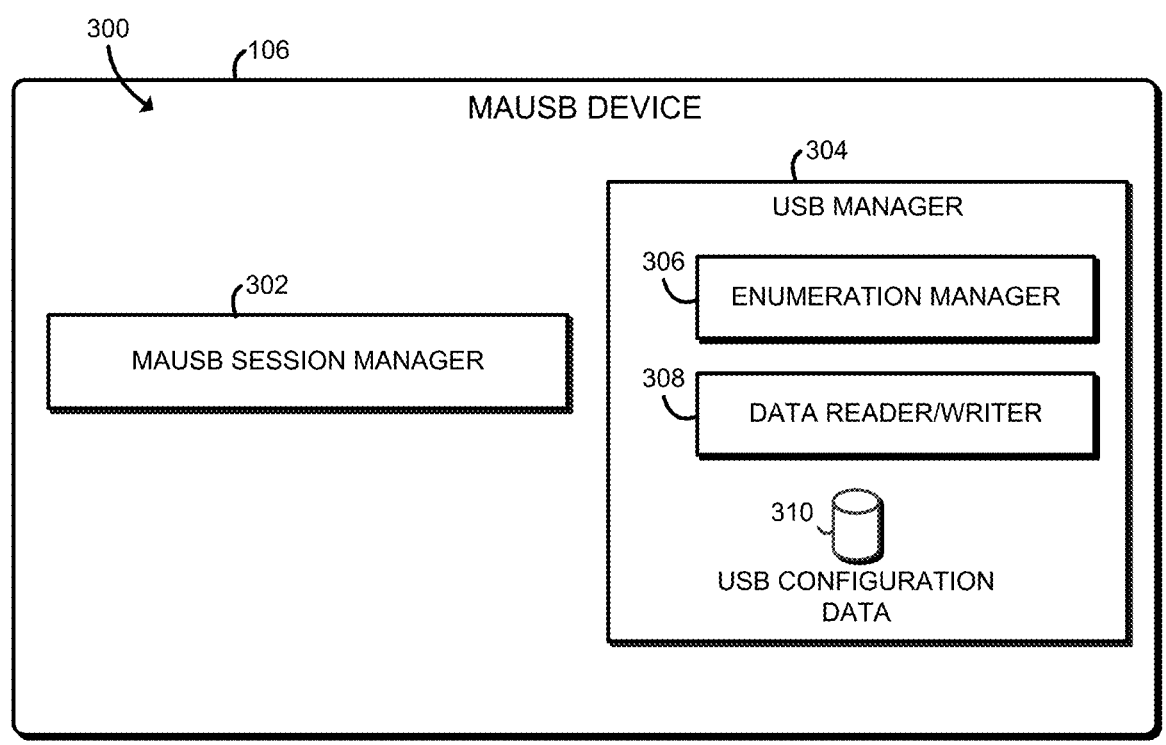
FIG. 3 is a simplified block diagram of at least one embodiment of an environment of an MAUSB device of FIG. 1.

Referring now to FIG. 3, in an illustrative embodiment, the MAUSB device 106 may establish an environment 300 during operation. The illustrative embodiment 300 includes an MAUSB session manager 302 and a USB manager 304. The various components of the environment 300 may be embodied as hardware, firmware, software, or a combination thereof. For example, the various modules, logic, and other components of the environment 300 may form a portion of, or otherwise be established by, the processor 124 or other hardware components of the MAUSB device 106 such as the memory 126. As such, in some embodiments, one or more of the components of the environment 300 may be embodied as circuitry or collection of electrical devices (e.g., an MAUSB session manager circuit 302, a USB manager circuit 304, etc.). It should be appreciated that, in such embodiments, one or more of the circuit (e.g., the MAUSB session manager circuit 302, the USB manager circuit 304, etc.) may form a portion of the processor 124, the memory 126, the I/O subsystem 128, and/or other components of the MAUSB device 106. Additionally, in some embodiments, one or more of the illustrative components may form a portion of another component and/or one or more of the illustrative components may be independent of one another. Also, although illustrated as being established by a single MAUSB device 106, in some embodiments the environment 300 may be established by several MAUSB devices 106 in communication over the network 104. Further, in some embodiments, one or more of the components of the environment 300 may be embodied as virtualized hardware components or emulated architecture, which may be established and maintained by the processor 124 or other components of the MAUSB device 106.

The MAUSB session manager 302 is configured to manage an MAUSB session with the host compute device 102. Similarly to the MAUSB session manager 202 of the host compute device 102, the MAUSB session manager 302 of the MAUSB device 106 handles the establishing and terminating of the physical link and the MAUSB session for the MAUSB device 106. For instance, the MAUSB session manager 302 may establish a link with the host compute device 102, such as a connection over Ethernet, InfiniBand®, Bluetooth®, Wi-Fi®, WiMAX, 3G, 4G LTE, etc. The MAUSB session manager 302 is further configured to establish and maintain an MAUSB session with the host compute device 102 over the physical link, as a complement to the MAUSB session manager 202 of the host compute device 102. Accordingly, the MAUSB session manager 302 may receive an initialize session message from the host compute device 102 and send a confirmation of the initialization to the host compute device 102. The MAUSB session manager 302 may facilitate operation of the MAUSB device 106 by sending and receiving messages.

It should be appreciated that, in some embodiments, the MAUSB device 106 may be connected to one or more USB devices 108 or other MAUSB devices 106, such as when the MAUSB device 106 is embodied as a hub. In such embodiments, the Host manager 306 may perform the same functions discussed above for the USB manager 206. The Host manager 306 may act as an intermediary to the USB manager 206 and the additional USB device 108.

The USB manager 304 is configured to establish and maintain a USB session with any other MAUSB device 106 and any other USB devices 108 connected to the MAUSB device 106. The USB manager 304 may be embodied as a cloud service or user process on the MAUSB device 106. Similarly to the USB manager 204 of the host compute device 102, the USB manager 304 of the MAUSB device 106 is used to manage the USB session and the USB devices 108 used in that session. In the illustrative embodiment, the USB manager 304 includes an enumeration manager 306, a data reader/writer 308, and USB configuration data 310. It should be appreciated that any of the components of the USB manager 304 may be combined to simplify the design of the USB manager 304. For example, the enumeration manager 306 and the data reader/writer 308 may be combined to be one manager to handle the enumeration and data reading and writing.

The enumeration manager 306 is configured to manage the enumeration of the MAUSB device 106 and/or USB devices 108 for use by the host compute device 102. In use, upon connecting to the host compute device 102 through an MAUSB session, the enumeration manager 306 sends an indication of the USB configuration data of the connected USB devices 108. In the illustrative embodiment, the enumeration manager 306 sends some or all of the USB configuration data 310 of the last known set of USB devices 108 that were connected to the MAUSB device 106. Additionally or alternatively, the enumeration manager 306 may send an indication of the USB configuration data, such as by sending a hash of the data or an index to a table stored on the host compute device 102. The USB configuration data may include information describing some or all of the USB devices connected to the MAUSB device. The USB configuration data may include an entry for each of the USB devices described by the USB configuration data. An entry for a USB device may include information such as device speed, a portion or all of one or more descriptors such as a device descriptor, configuration descriptor, etc., past address assignment, past device configuration, and any other relevant information.

The enumeration manager 306 is further configured to perform an enumeration of the attached MAUSB devices 106. To do so, upon initiation of an MAUSB session, the enumeration manager 306 may send and receive messages in accordance with an enumeration process, but the enumeration manager 306 may do so without involving the host compute device 102 in regard some or all of the messages sent and received. Some or all of the information that would be received from the host compute device 102 in configuring and enumerating the USB devices 108 may be included in the USB configuration data 310, so involving the host compute device 102 in these messages may not be necessary. It should be appreciated that the enumeration may involves steps that typically require some input from the host compute device 102, such as assigning an address or setting a configuration of the USB device 108. However, the enumeration manager 306 may handle some or all of those steps without involving the host compute device 102. After the enumeration is complete, the MAUSB device 106 may send an indication the host compute device 102. The enumeration manager 306 may identify any changes in the topology or configuration of the USB devices 108 from the last known configuration and update the USB configuration data 310 accordingly as well as update the host compute device 102 of any changes. In addition to the enumeration process described above, the enumeration manager 306 may facilitate an enumeration that takes place between the host compute device 102 and a USB device 308, such as when a new USB device 308 is plugged in or a new USB device 108 was found during the initial enumeration.

The data reader/writer 308 is configured to perform data reads and writes. For example, the data reader/writer 308 may receive a data read or write request from the host compute device 102 and pass the read or write request to a connected USB device 108. In some embodiments, the virtual enumeration performed by the host compute device 102 may be completed before the enumeration of the USB devices 108 is completed by the MAUSB device 106. In such embodiments, the USB manager 306 may present the USB devices 108 as connected and ready to send and receive data to clients on the host compute device 102, such as applications running on the host compute device 102. If a client attempts to send or read data on a USB device 108 before the enumeration of the USB devices 108 by the MAUSB device 106 has completed, the data reader/writer 308 may receive such a request and buffer it until the enumeration of the USB devices 108 by the MAUSB device 106 is complete, and then send the data read or write request at that point.

As described above, the stored USB configuration data 310 may include information describing some or all of the USB devices 108 that the MAUSB device 106 has previously connected to. The MAUSB device 106 may, for example, store the USB configuration data 310 of the USB devices 108 associated with the most recent MAUSB session or store the USB configuration data 310 of USB devices 108 the MAUSB device 106 has connected to in a certain time frame. The USB configuration data 310 may include an entry for each of the USB devices 108. An entry for a USB device 108 may include information such as device speed, a portion or all of one or more descriptors such as a device descriptor, configuration descriptor, etc., past address assignment, past device configuration, and any other relevant information. For example, an entry in the USB configuration data 310 may include some or all of the device descriptor, the configuration descriptor, the interface descriptor, the endpoint descriptor.

In the illustrative embodiment, the USB manager 304 updates the USB configuration data 310 during normal operation, such as during enumeration and when a device is plugged in or unplugged. The USB manager 304 may also update the USB configuration data 310 when the host compute device 102 changes the configuration of a connected USB device 108. In some embodiments, the USB manager 304 may determine what USB devices 108 are connected to the MAUSB device 106 prior to sending the USB configuration data to the host compute device 102. In such embodiments, the USB manager 304 may update the USB configuration data 310 prior to sending it to the host compute device 102. For example, the USB manager 304 may determine which USB devices 108 are connected to the MAUSB device 106 and perform a full enumeration of the USB devices 108 using the stored USB configuration data 310 when the MAUSB device 106 is turned on, even if the MAUSB device 106 is not yet connected to a host compute device 102.

Figure 4:
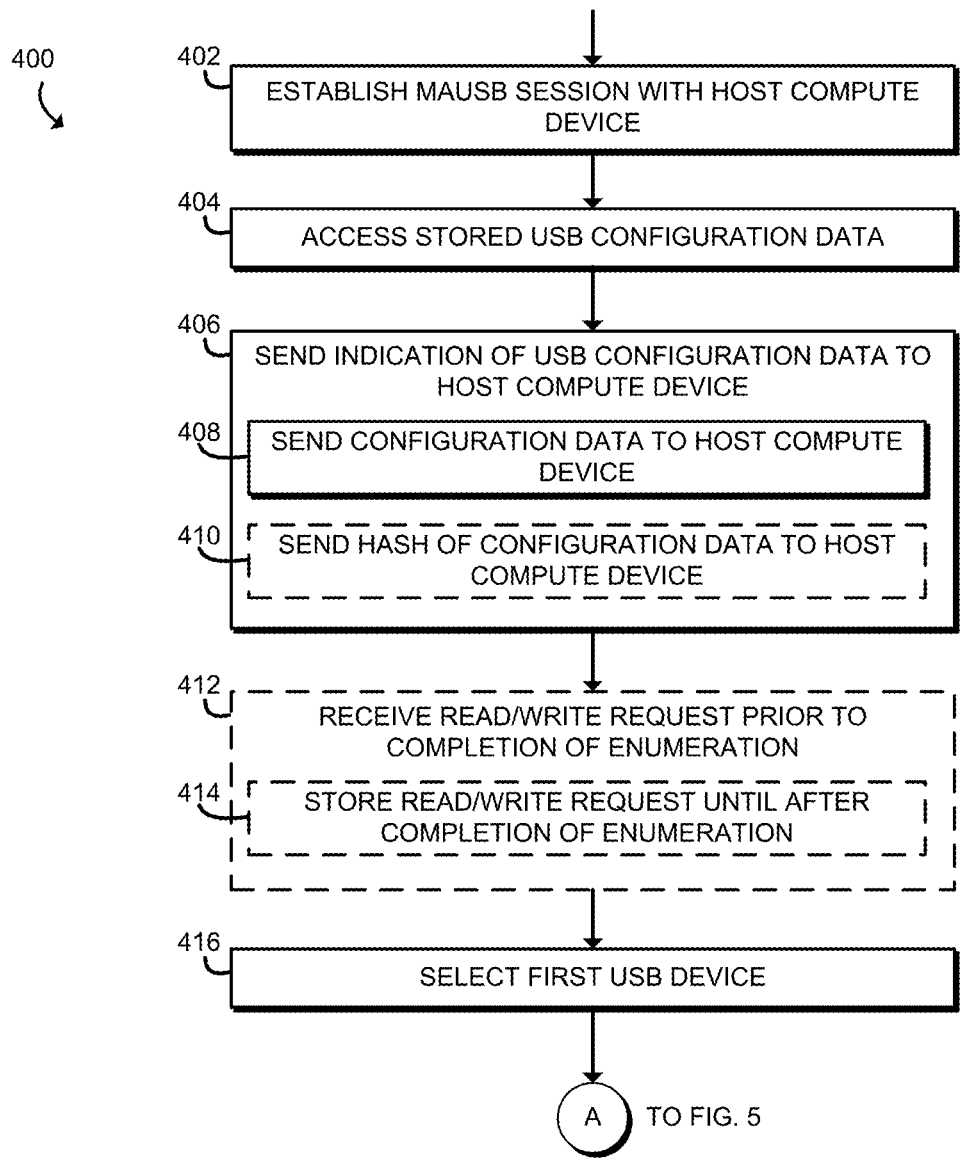
FIGS. 4-6 are a simplified flow diagram of at least one embodiment of a method for enumerating USB devices that may be executed by the MAUSB device of FIGS. 1 and 3.

Referring now to FIG. 4, in use, the MAUSB device 106 may execute a method 400 for enumerating USB devices. It should be appreciated that, in some embodiments, the operations of the method 400 may be performed by one or more components of the environment 300 of the MAUSB device 106 as shown in FIG. 3. The method 400 begins in block 402, in which the MAUSB device 106 establishes an MAUSB session with a host compute device 102 over a link. The link to the host compute device 102 may be a wireless communication link such as a WiFi link, a Bluetooth link, etc. The host compute device 102 may send an initialization message to the MAUSB device 106 to establish the MAUSB session.

In block 404, the MAUSB device 106 accesses USB configuration data stored in the MAUSB device 106. The USB configuration data may include an entry for each of the USB devices 108 attached to the MAUSB device 106. An entry for a USB device 108 may include information such as device speed, a portion or all of one or more descriptors such as a device descriptor, configuration descriptor, etc., past address assignment, past device configuration, and any other relevant information. For example, an entry in the USB configuration data 212 may include some or all of the device descriptor, the configuration descriptor, the interface descriptor, and the endpoint descriptor. In the illustrative embodiment, the MAUSB device 106 accesses USB configuration data for each of the USB devices 108 that were attached to the MAUSB device 106 in the last known configuration without querying the USB devices 108 to determine which devices are currently connected. In some embodiments, the MAUSB device 106 may determine which USB devices 108 are currently connected in block 404 and update the USB configuration data accordingly.

In block 406, the MAUSB device 106 sends an indication of the USB configuration data to the host compute device 102. The MAUSB device 106 may send an indication of the USB configuration data in any way, such as by sending the USB configuration data to the host compute device 102 in block 408 or by sending a hash of USB configuration data in block 410. In some embodiments, the MAUSB device 106 may not sent an explicit indication of the USB configuration data, but, rather, the host compute device 102 may infer the USB configuration data to use based on an identification of the MAUSB device 106, such as a serial number or media access control (MAC) address of the MAUSB device 106.

In block 412, in some embodiments, the MAUSB device 106 may receive a read/write request from the host compute device 102 prior to completion of enumeration of the USB devices 108. The MAUSB device 106 may store such a read/write request in block 414 until after the enumeration is complete.

Figure 5:
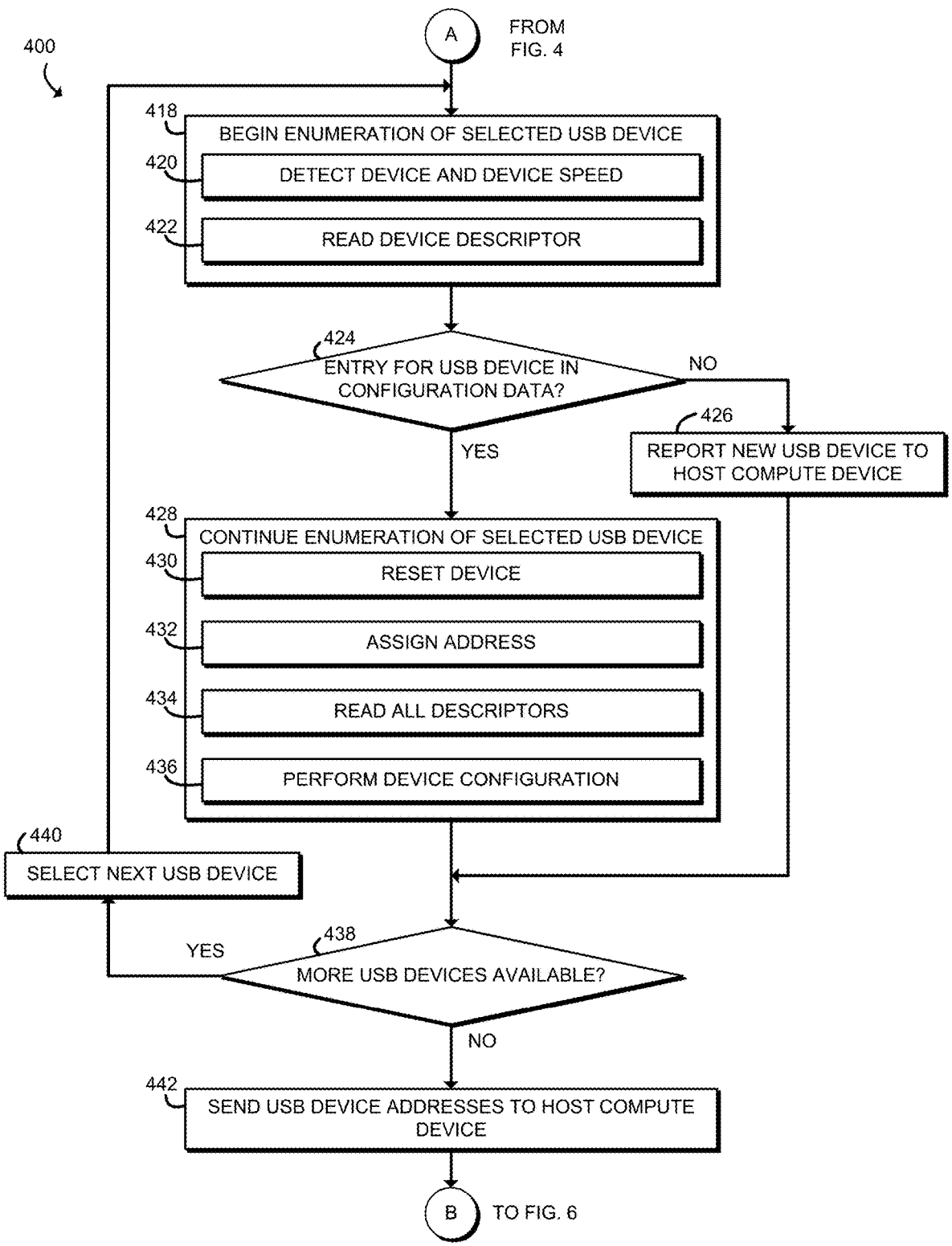

In block 416, the MAUSB device 106 selects the first USB device 108 to be enumeration. In some embodiments, the MAUSB device 106 itself may be the first device selected and enumerated. In block 418, in FIG. 5, the MAUSB device 106 begins enumeration of the selected USB device 108. The MAUSB device 106 may detect the device and the device speed in block 420 and may read the device descriptor in block 422. If there is not an entry for the USB device 108 in the USB configuration data, the method 400 proceeds to block 426, in which the MAUSB device 106 reports the presence of a new USB device 108 to the host compute device 102. As discussed in more detail below, the host compute device 102 may subsequently enumerate new USB devices 108. The method 400 then proceeds to block 438, in which the MAUSB device 106 determines whether more USB devices 108 are available.

Referring back to block 424, if there is an entry for the USB device 108 in the USB configuration data, the method 400 proceeds to block 428, in which the MAUSB device 106 continues enumeration of the selected USB device 108. The MAUSB device 106 may perform several actions as part of the enumeration, such as by resetting the USB device 108 in block 430, assigning an address the USB device 108 in block 432, reading all of the descriptors of the USB device 108 in block 434, and performing a device configuration in block 436. Some or all of the actions taken as part of the enumeration process may rely on or otherwise use a part of the USB configuration data. For example, the USB configuration data may include an address recently used by the USB device 108, which the MAUSB device 106 may assign to the USB device 108. The USB configuration data may also include an indication of the previous device configuration, which may be used to set the device configuration. In some embodiments, the USB device may report only one configuration, so the MAUSB device may use that configuration without relying on or otherwise using the USB configuration data. It should be appreciated that, in the illustrative embodiment, some or all of the messages that would or could be sent and received to and from the host compute device 102 during the enumeration process may not be sent or received. In other words, in some embodiments, the MAUSB device 106 may perform enumeration of the USB device 108 without any communication with the host compute device 102 during the enumeration process.

In block 438, if there are more USB devices 108 available, the method proceeds to block 440 to select the next USB device 108 and then loops back to block 418 to begin enumeration of the next USB device 108. It should be appreciated that, in some embodiments, the MAUSB device 106 may enumerate more than one of the USB devices 108 at the same time. For example, the MAUSB device 106 may enumerate the USB devices 108 connected to a first port in parallel with enumeration of the USB devices 108 connected to a second port. If there are not more USB devices 108 available, the method proceeds to block 442, in which the MAUSB device 106 sends the addresses assigned to the USB devices 108 to the host compute device 102. In some embodiments, the host compute device 102 may assign addresses to USB devices 108 that are different from the addresses assigned by the MAUSB device 106. Sending the USB device addresses to the host compute device 102 allows the host compute device 102 to update the assigned addresses to be consistent with the addresses assigned by the MAUSB device 106. The MAUSB device 106 may also send other relevant information, such as the configuration used for each USB device 108 or if there was a difference in any of the device descriptors.

Figure 6:
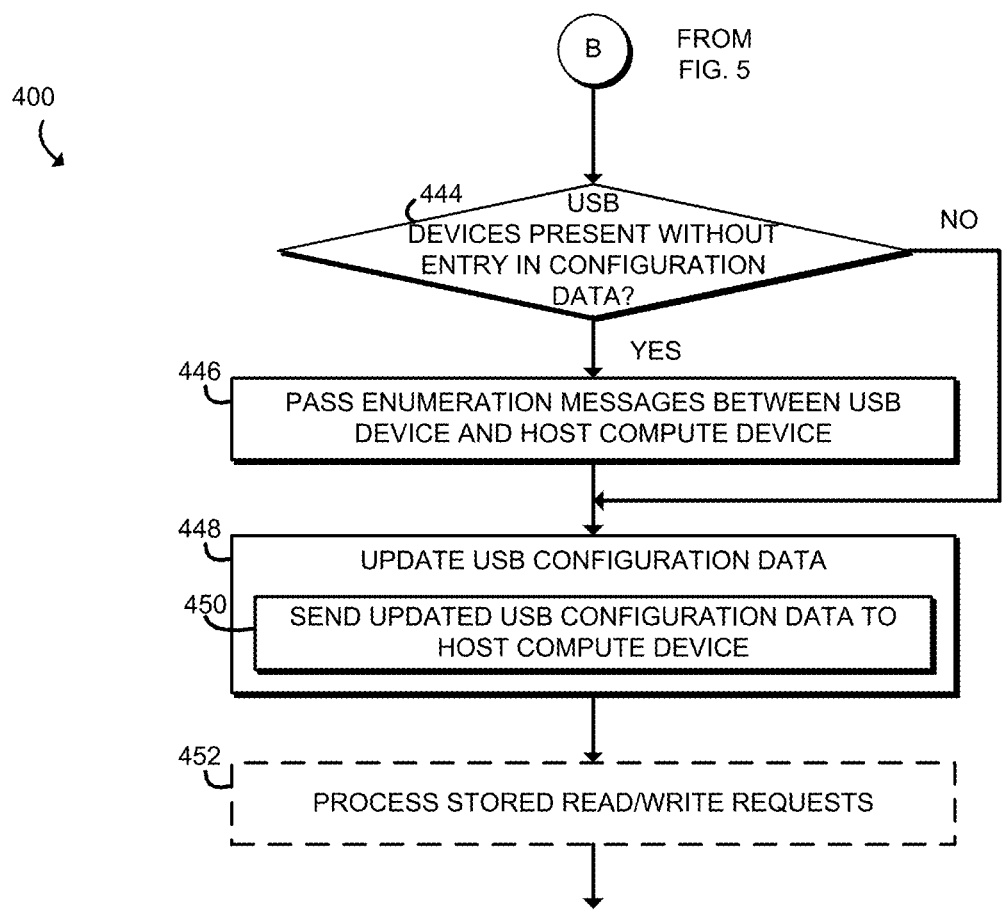

In block 444, in FIG. 6, if there are USB devices 108 present without an entry in the USB configuration data (i.e., if there are USB devices 108 connected that were not connected in the previous configuration), the method 400 proceeds to block 446, in which the MAUSB device 106 facilitates enumeration of the new USB device 108 by the host compute device 102. If there are not USB devices 108 present without an entry in the USB configuration data, the method 400 proceeds to block 448, in which the MAUSB device 106 updates the USB configuration data. The MAUSB device 106 may update the USB configuration data to reflect the current configuration of USB devices 108 connected to the MAUSB device 106. In block 450, the MAUSB device 106 sends the updated USB configuration data to the host compute device 102. As part of sending the USB configuration data, the MAUSB device 106 may indicate to or otherwise notify the host compute device 102 that the a USB device 108 that was previously connected is not currently connected.

In block 452, in some embodiments, the MAUSB device 106 may process stored read or write requests that were previously received while the enumeration process was ongoing. In the illustrative embodiment, the MAUSB device 106 processes the read or write requests in the order in which they were received.

Figure 7:
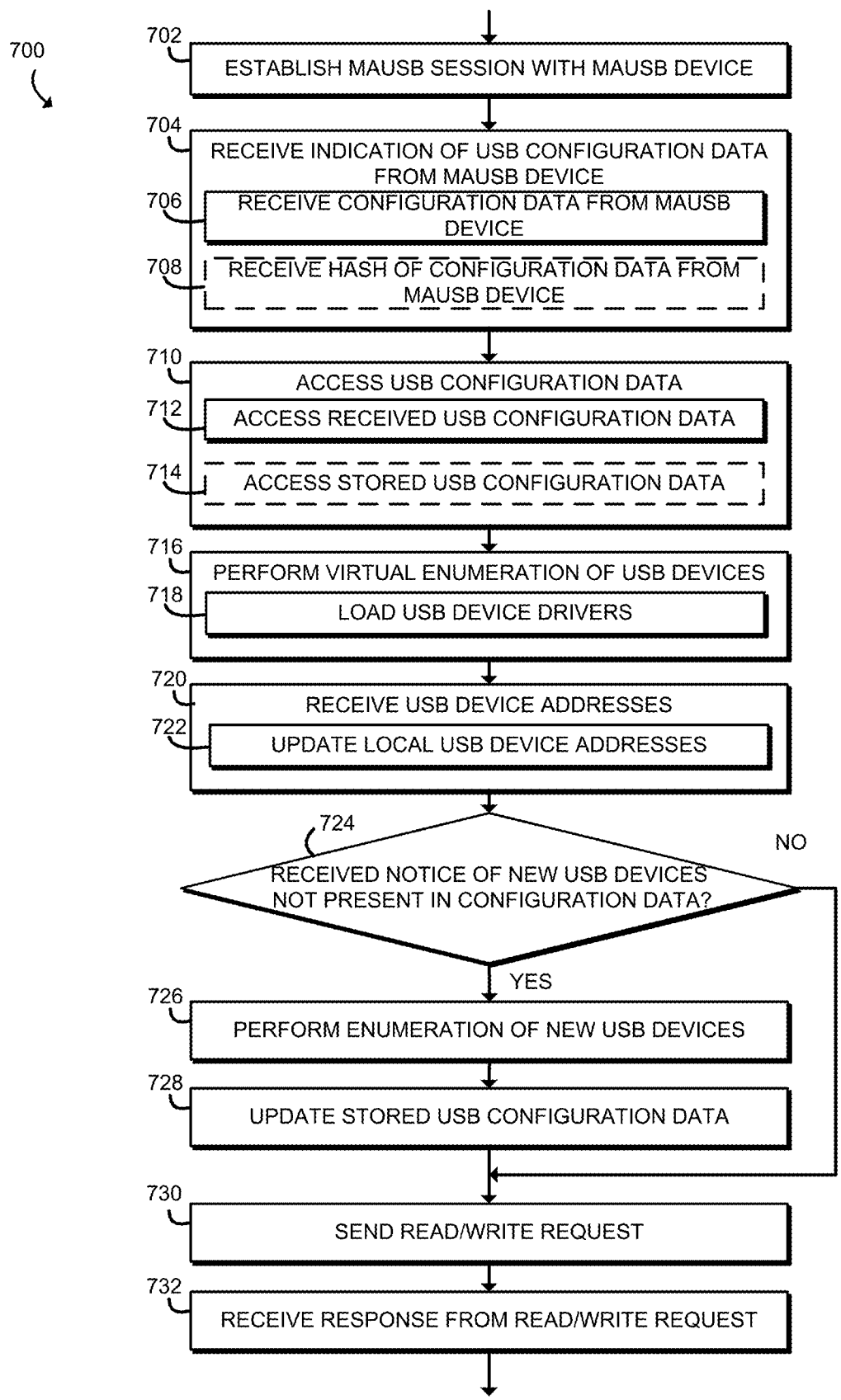
FIG. 7 is a simplified flow diagram of at least one embodiment of a method enumerating USB devices that may be executed by the host compute device of FIGS. 1 and 2.

Referring now to FIG. 7, in use, the host compute device 102 may execute a method 700 for enumerating USB devices. It should be appreciated that, in some embodiments, the operations of the method 800 may be performed by one or more components of the environment 200 of the host compute device 102 as shown in FIG. 2. The method 700 begins in block 702, in which the host compute device 102 establishes an MAUSB session with an MAUSB device 106 over a link. The link to the MAUSB device 106 may be a wireless communication link such as a WiFi link, a Bluetooth link, etc. The host compute device 102 may send an initialization message to the MAUSB device 106 to establish the MAUSB session.

In block 704, the host compute device 102 receives an indication of USB configuration data from the MAUSB device 106. The USB configuration data may include an entry for each of the USB devices 108 that is or previously was attached to the MAUSB device 106. An entry for a USB device 108 may include information such as device speed, a portion or all of one or more descriptors such as a device descriptor, configuration descriptor, etc., past address assignment, past device configuration, and any other relevant information. For example, an entry in the USB configuration data 212 may include some or all of the device descriptor, the configuration descriptor, the interface descriptor, and the endpoint descriptor. The host compute device 102 may receive an indication of the USB configuration data in any way, such as by receiving the USB configuration data from the MAUSB device 106 in block 706 or by receiving a hash of USB configuration data in block 708. In some embodiments, the host compute device 102 may not receive an explicit indication of the USB configuration data, but, rather, the host compute device 102 may infer the USB configuration data to use based on an identification of the MAUSB device 106, such as a serial number or media access control (MAC) address of the MAUSB device 106.

In block 710, the host compute device 102 accesses the USB configuration data. In the illustrative embodiment, the host compute device 102 accesses in block 712 the USB configuration data received from the MAUSB device 106 in block 706. Additionally or alternatively, in some embodiments, the host compute device 102 may access the USB configuration data in block 714 by accessing stored USB configuration data and comparing the stored USB configuration data to the indication of the USB configuration data received from the MAUSB device 106, such as by hashing the stored USB configuration data and comparing it to the hash received from the MAUSB device 106.

In block 716, the host compute device 102 performs a virtual enumeration of the USB devices 108 indicated to be available in the USB configuration data. In such a virtual enumeration, in the illustrative embodiment, the host compute device 102 may perform the same steps as a typical enumeration, but without actually communicating with the MAUSB device 106 or USB devices 108. Instead, the host compute device 102 may rely on the USB configuration data to determine the expected responses from the MAUSB device 106 or USB devices 108 and react accordingly. The host compute device 102 may take certain steps as part of the virtual enumeration, such as loading suitable USB device drivers in block 718. A virtual enumeration of a USB device 108 is an enumeration in which some or all of the messages that are typically passed between the host and the USB device are not actually passed. As discussed in more detail above in regard to blocks 418-436 of the method 400, several messages may be passed back and forth between the MAUSB device 106 and the USB device 108 during the physical enumeration of the USB devices 108, but, since the host compute device 102 already has the USB configuration data of the connected USB devices 108, the host compute device 102 need not send and receive the messages involved in enumeration but may only need to configure the host compute device 102 in a similar manner as occurs during configuration. For example, the host compute device 102 may assign each USB device 108 an address and load suitable drivers for each USB device 108 in block 718. It should be appreciated that the USB devices 108 may not be aware that the enumeration messages are not being sent to or sent by the host compute device 102.

In block 720, the host compute device 102 receives the addresses assigned to the USB device 108 by the MAUSB device 106. In some embodiments, the addresses assigned may be included in the USB configuration data and may not be different from the addresses assigned to the USB devices 108 by the host compute device 102. Additionally or alternatively, in some embodiments, the MAUSB device 106 may assign addresses to the USB devices 108 that are not the same as the addresses assigned by the host compute device 102. In such embodiments, the host compute device 102 may update the addresses assigned to the USB devices 108 on the host compute device 102 in block 722. It should be appreciated that, in some embodiments, the host compute device 102 may not present the USB devices 102 to clients such as applications running on the host compute device 102 until after receiving the addresses assigned to the USB devices 108. Additionally or alternatively, in some embodiments, the host compute device 102 may present the USB devices 102 to client applications even though the host compute device 102 has not received an indication that a particular USB device 108 was assigned a particular address.

In block 724, if the host compute device 102 received a notice of new USB devices 108 not present in the USB configuration data previously received, the host compute device 102 proceeds to block 726, in which the host compute device 102 performs an enumeration of the new USB devices 108. It should be appreciated that the host compute device 102 may send and receive messages to and from the USB device 108 as part of the enumeration process of the new USB devices 108. In block 728, the host compute device may update the stored USB configuration data to reflect the addition of the new USB devices 108.

Referring back to block 724, if there was not a notice of new USB devices 108, the method 700 proceeds to block 730, in which the host compute device 102 may send read and write requests to the USB devices 108. It should be appreciated that, in some embodiments, the host compute device 102 may send read and write requests after the host compute device 102 has completed the virtual enumeration of a USB device 108 but before the MAUSB device 106 has completed the physical enumeration of the USB device 108. In block 732, the host compute device 102 may receive a response from the read or write request, such as the data to be read or a confirmation of a write that was performed.

Figure 8:
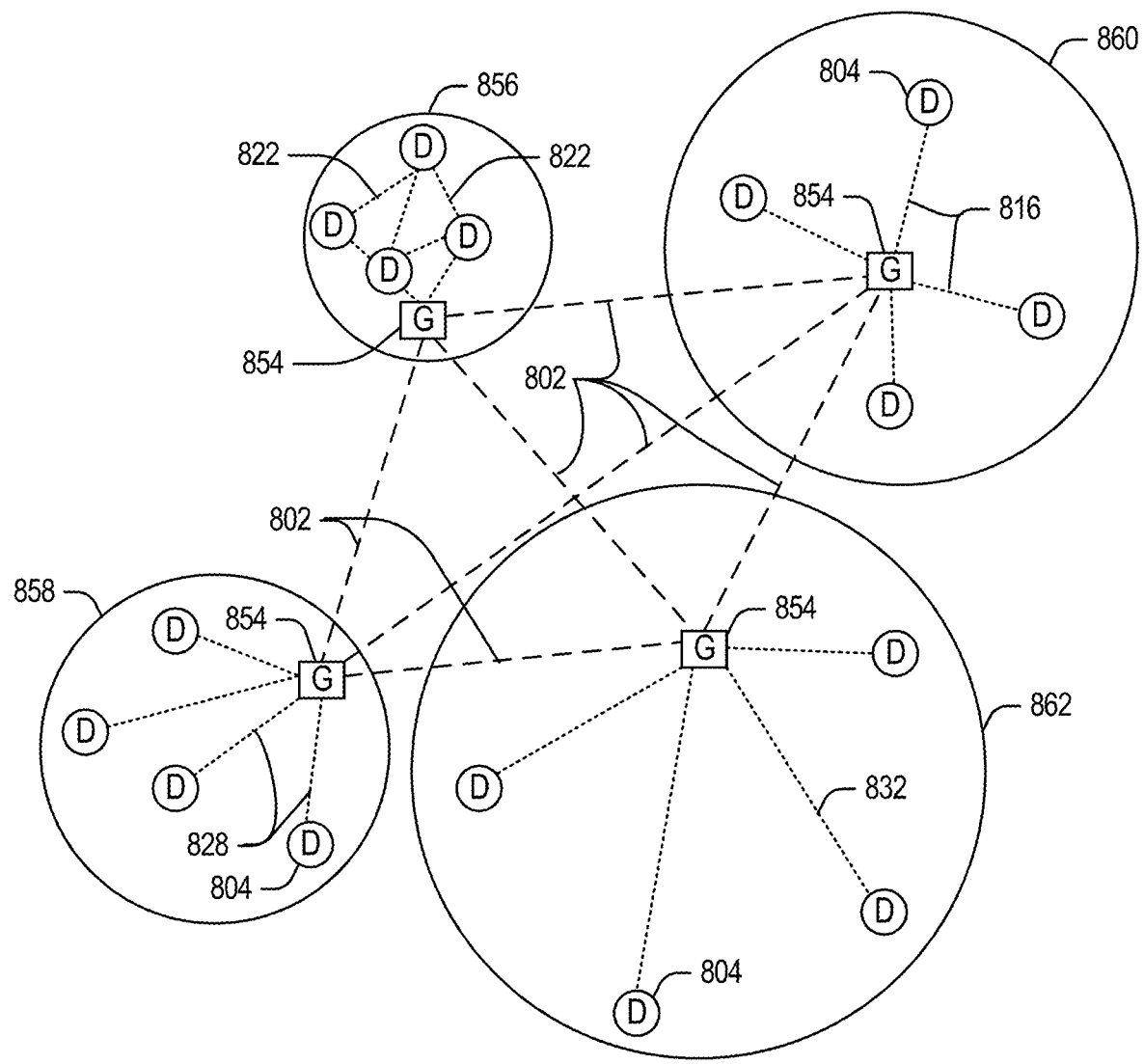
FIG. 8 is a simplified domain topology of at least one embodiment for respective internet-of-things (IoT) networks coupled through links to respective gateways, according to an example.

Referring now to FIGS. 8-11, in some embodiments, some or all of the technology described above may be embodied as or interact with one or more internet-of-things devices. FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
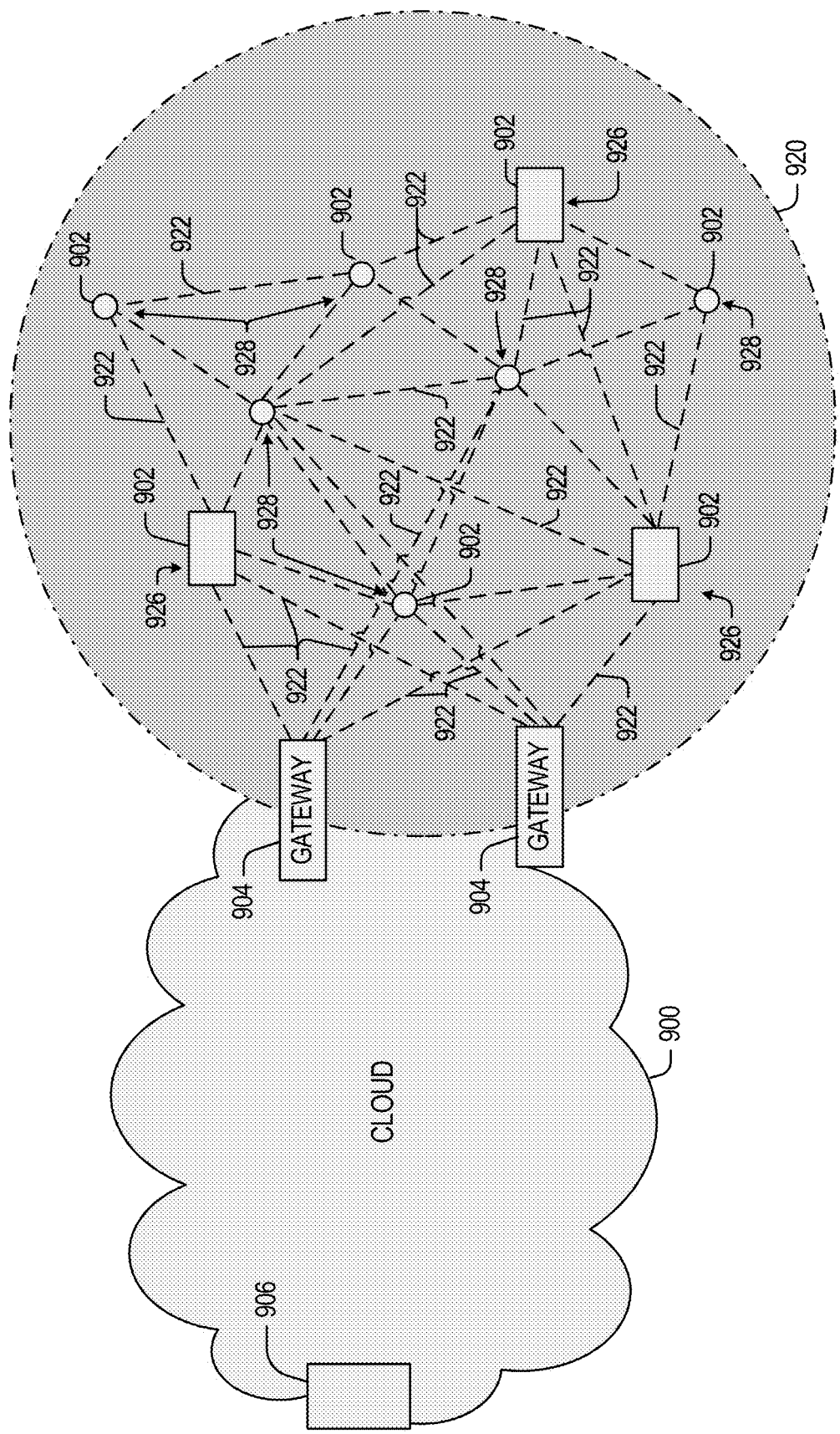
FIG. 9 is a simplified cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.9 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
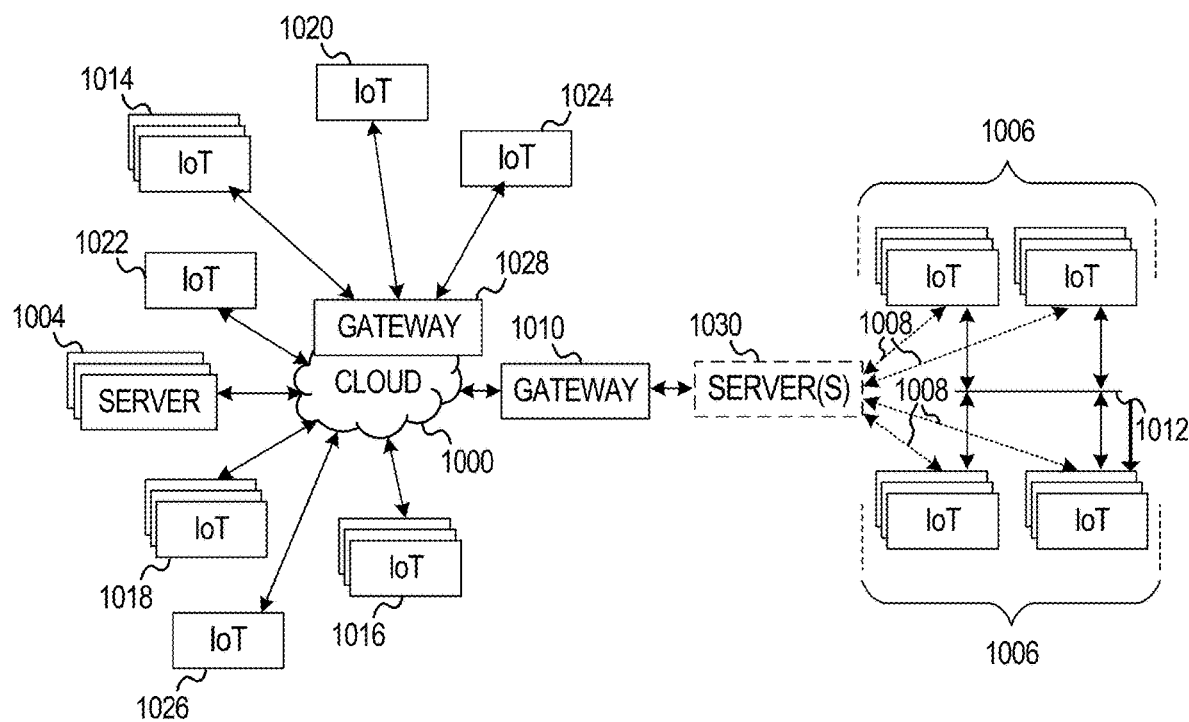
FIG. 10 is a simplified a block diagram of at least one embodiment of a network illustrating communications among a number of IoT devices.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1110 or 1128 to communicate with remote locations such as the cloud 1100; the IoT devices may also use one or more servers 1130 to facilitate communication with the cloud 1100 or with the gateway 1110. For example, the one or more servers 1130 may operate as an intermediate network node to support a local edge cloud or fog implementation among a local area network. Further, the gateway 1128 that is depicted may operate in a cloud-to-gateway-to-many edge devices configuration, such as with the various IoT devices 1114, 1120, 1124 being constrained or dynamic to an assignment and use of resources in the cloud 1100.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
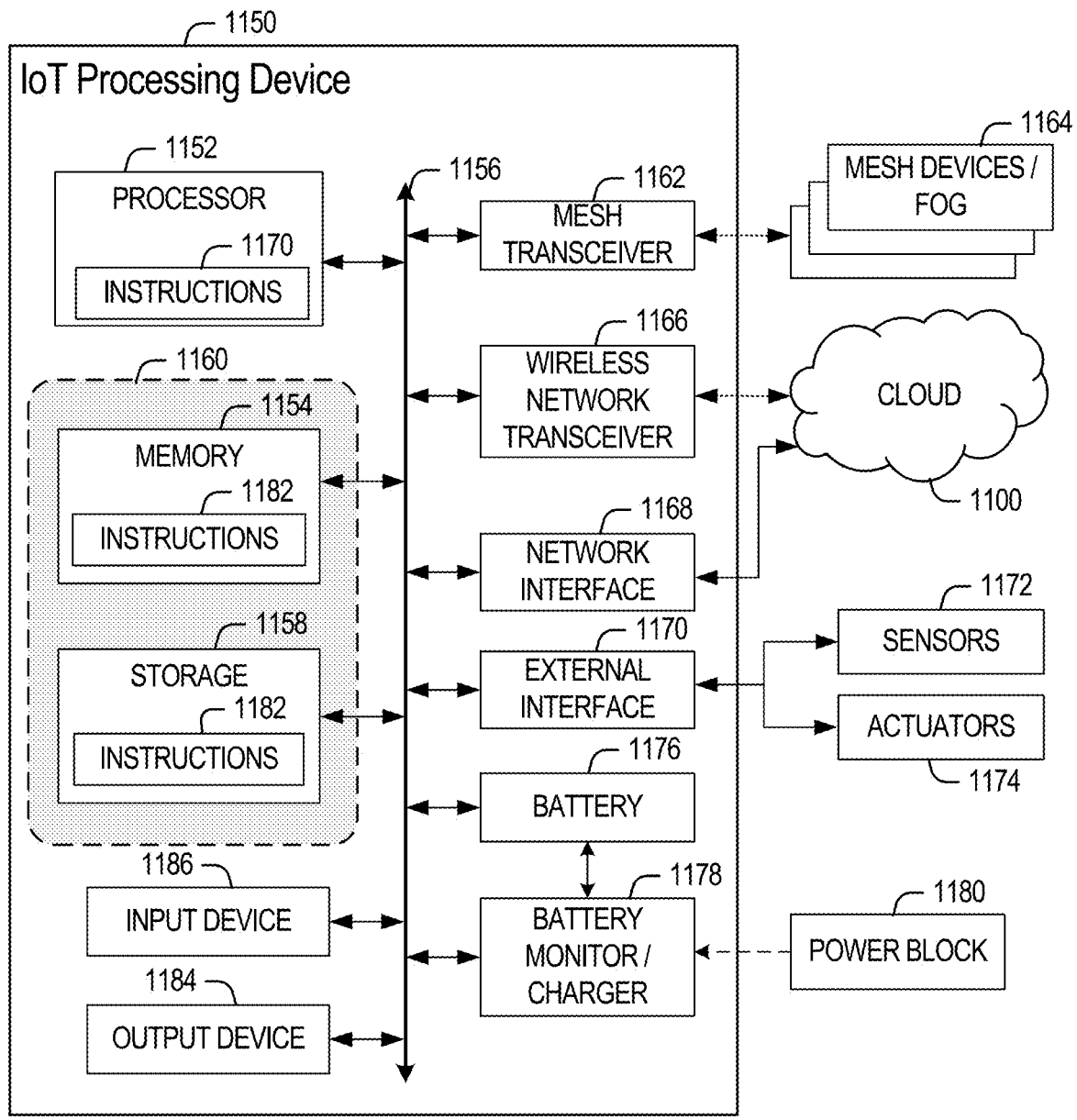
FIG. 11 is a simplified block diagram of at least one embodiment of an IoT processing system architecture upon which any one or more of the techniques (e.g., operations, processes, methods, and methodologies) discussed herein may be performed.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A8 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.9 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 8 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

EXAMPLES

Illustrative examples of the technologies disclosed herein are provided below. An embodiment of the technologies may include any one or more, and any combination of, the examples described below.

Example 1 includes a media agnostic universal serial bus (MAUSB) device for enumerating universal serial bus (USB) devices, the MAUSB device comprising an MAUSB session manager to establish an MAUSB session with a host compute device; and a USB manager to send an indication of USB configuration data stored on the MAUSB device to the host compute device; and enumerate, by the MAUSB device, one or more USB devices connected to the MAUSB device.

Example 2 includes the subject matter of Example 1, and wherein to send the indication of the USB configuration data to the host compute device comprises to send the USB configuration data to the host compute device.

Example 3 includes the subject matter of any of Examples 1 and 2, and wherein to send the indication of the USB configuration data to the host compute device comprises to send a hash of the USB configuration data to the host compute device.

Example 4 includes the subject matter of any of Examples 1-3, and wherein the USB manager is further to receive a read or write request for one of the one or more USB devices prior to completion of enumeration of the one of the one or more USB devices; store the read or write request until completion of enumeration of the one of the one or more USB devices; and process the read or write request after completion of enumeration of the one of the one or more USB devices.

Example 5 includes the subject matter of any of Examples 1-4, and wherein to enumerate the one or more USB devices comprises to enumerate the one or more USB devices without communication with the host compute device regarding enumeration of the one or more USB devices.

Example 6 includes the subject matter of any of Examples 1-5, and wherein to send the indication of USB configuration data stored on the MAUSB device to the host compute device comprises to send the configuration data before enumeration of the one or more USB devices connected to the MAUSB device.

Example 7 includes the subject matter of any of Examples 1-6, and wherein the USB manager is further to determine that one of the one or more USB devices does not have an entry in the USB configuration data; and notify the host compute device that the one of the one or more USB devices does not have an entry in the USB configuration data.

Example 8 includes the subject matter of any of Examples 1-7, and wherein the USB manager is further to pass enumeration messages between the one of the one or more USB devices and the host compute device.

Example 9 includes the subject matter of any of Examples 1-8, and wherein the USB manager is further to update the USB configuration data to include an entry for the one of the one or more USB devices based on the enumeration messages.

Example 10 includes the subject matter of any of Examples 1-9, and wherein the USB manager is further to determine that an entry in the USB configuration data corresponds to a USB device that is not connected to the MAUSB device; notify the host compute device that the entry corresponds to a USB device that is not connected to the MAUSB device; and update the USB configuration data to remove the entry.

Example 11 includes a host compute device for enumerating universal serial bus (USB) devices, the host compute device comprising an MAUSB session manager to establish a media agnostic USB (MAUSB) session with an MAUSB device; and a USB manager to receive an indication of USB configuration data stored on the MAUSB device from the MAUSB device; and perform, based on the USB configuration data, a virtual enumeration of one or more USB devices connected to the MAUSB device.

Example 12 includes the subject matter of Example 11, and wherein to receive the indication of the USB configuration data to the host compute device comprises to receive the USB configuration data to the host compute device.

Example 13 includes the subject matter of any of Examples 11 and 12, and wherein to receive the indication of the USB configuration data to the host compute device comprises to receive a hash of the USB configuration data to the host compute device.

Example 14 includes the subject matter of any of Examples 11-13, and wherein to perform the virtual enumeration of the one or more USB devices comprises to perform a virtual enumeration of the one or more USB devices without communication with the MAUSB device regarding the enumeration of the one or more USB devices.

Example 15 includes the subject matter of any of Examples 11-14, and wherein the USB manager is further to load device drivers for the one or more USB devices without communication with the MAUSB device regarding enumeration of the one or more USB devices.

Example 16 includes the subject matter of any of Examples 11-15, and wherein the USB manager is further to send a read or write request for one of the one or more USB devices to the MAUSB device without communication with the MAUSB device regarding enumeration of the one of the one or more USB devices.

Example 17 includes the subject matter of any of Examples 11-16, and wherein to receive the indication of the USB configuration data stored on the MAUSB device from the MAUSB device comprises to receive the indication of the USB configuration data before performance of the virtual enumeration of the one or more USB devices connected to the MAUSB device.

Example 18 includes the subject matter of any of Examples 11-17, and wherein the USB manager is further to receive USB device addresses of the one or more USB devices; and update local USB device addresses for the one or more USB devices.

Example 19 includes the subject matter of any of Examples 11-18, and wherein the USB manager is further to receive a notification of a USB device that does not have an entry in the USB configuration data; and perform enumeration of the USB device that does not have an entry in the USB configuration data.

Example 20 includes the subject matter of any of Examples 11-19, and wherein the USB manager is further to update the USB configuration data based on the enumeration of the USB device that does not have an entry in the USB configuration data.

Example 21 includes a method for enumerating universal serial bus (USB) devices, the method comprising establishing, by a media agnostic USB (MAUSB) device, an MAUSB session with a host compute device; sending, by the MAUSB device, an indication of USB configuration data stored on the MAUSB device to the host compute device; and enumerating, by the MAUSB device, one or more USB devices connected to the MAUSB device.

Example 22 includes the subject matter of Example 21, and wherein sending the indication of the USB configuration data to the host compute device comprises sending the USB configuration data to the host compute device.

Example 23 includes the subject matter of any of Examples 21 and 22, and wherein sending the indication of the USB configuration data to the host compute device comprises sending a hash of the USB configuration data to the host compute device.

Example 24 includes the subject matter of any of Examples 21-23, and further including receiving, by the MAUSB device, a read or write request for one of the one or more USB devices prior to completion of enumerating the one of the one or more USB devices; storing, by the MAUSB device, the read or write request until completion of enumerating the one of the one or more USB devices; and processing, by the MAUSB device, the read or write request after completion of enumerating the one of the one or more USB devices.

Example 25 includes the subject matter of any of Examples 21-24, and wherein enumerating the one or more USB devices comprises enumerating the one or more USB devices without communication with the host compute device regarding enumeration of the one or more USB devices.

Example 26 includes the subject matter of any of Examples 21-25, and wherein sending the indication of USB configuration data stored on the MAUSB device to the host compute device comprises sending the configuration data before enumerating the one or more USB devices connected to the MAUSB device.

Example 27 includes the subject matter of any of Examples 21-26, and further including determining, by the MAUSB device, that one of the one or more USB devices does not have an entry in the USB configuration data; and notifying, by the MAUSB device, the host compute device that the one of the one or more USB devices does not have an entry in the USB configuration data.

Example 28 includes the subject matter of any of Examples 21-27, and further including passing, by the MAUSB device, enumeration messages between the one of the one or more USB devices and the host compute device.

Example 29 includes the subject matter of any of Examples 21-28, and further including updating, by the MAUSB device, the USB configuration data to include an entry for the one of the one or more USB devices based on the enumeration messages.

Example 30 includes the subject matter of any of Examples 21-29, and further including determining, by the MAUSB device, that an entry in the USB configuration data corresponds to a USB device that is not connected to the MAUSB device; notifying, by the MAUSB device, the host compute device that the entry corresponds to a USB device that is not connected to the MAUSB device; and updating, by the MAUSB device, the USB configuration data to remove the entry.

Example 31 includes a method for enumerating universal serial bus (USB) devices, the method comprising establishing, by a host compute device, a media agnostic USB (MAUSB) session with an MAUSB device; receiving, by the host compute device, an indication of USB configuration data stored on the MAUSB device from the MAUSB device; and performing, by the host compute device and based on the USB configuration data, a virtual enumeration of one or more USB devices connected to the MAUSB device.

Example 32 includes the subject matter of Example 31, and wherein receiving the indication of the USB configuration data to the host compute device comprises receiving the USB configuration data to the host compute device.

Example 33 includes the subject matter of any of Examples 31 and 32, and wherein receiving the indication of the USB configuration data to the host compute device comprises receiving a hash of the USB configuration data to the host compute device.

Example 34 includes the subject matter of any of Examples 31-33, and wherein performing the virtual enumeration of the one or more USB devices comprises performing a virtual enumeration of the one or more USB devices without communication with the MAUSB device regarding the enumeration of the one or more USB devices.

Example 35 includes the subject matter of any of Examples 31-34, and further including loading, by the host compute device, device drivers for the one or more USB devices without communication with the MAUSB device regarding enumeration of the one or more USB devices.

Example 36 includes the subject matter of any of Examples 31-35, and further including sending, by the host compute device, a read or write request for one of the one or more USB devices to the MAUSB device without communication with the MAUSB device regarding enumeration of the one of the one or more USB devices.

Example 37 includes the subject matter of any of Examples 31-36, and wherein receiving the indication of the USB configuration data stored on the MAUSB device from the MAUSB device comprises receiving the indication of the USB configuration data before performing the virtual enumeration of the one or more USB devices connected to the MAUSB device.

Example 38 includes the subject matter of any of Examples 31-37, and further including receiving, by the host compute device, USB device addresses of the one or more USB devices; and updating, by the host compute device, local USB device addresses for the one or more USB devices.

Example 39 includes the subject matter of any of Examples 31-38, and further including receiving, by the host compute device, a notification of a USB device that does not have an entry in the USB configuration data; and performing, by the host compute device, enumeration of the USB device that does not have an entry in the USB configuration data.

Example 40 includes the subject matter of any of Examples 31-39, and further including updating, by the host compute device, the USB configuration data based on the enumeration of the USB device that does not have an entry in the USB configuration data.

Example 41 includes one or more computer-readable media comprising a plurality of instructions stored thereon that, when executed, causes a compute device to perform the method of any of Examples 21-40.

Example 42 includes a compute device comprising means to perform the method of any of Examples 21-40.

Example 43 includes a media agnostic universal serial bus (MAUSB) device for enumerating universal serial bus (USB) devices, the MAUSB device comprising means for establishing, by the MAUSB device, an MAUSB session with a host compute device; means for sending, by the MAUSB device, an indication of USB configuration data stored on the MAUSB device to the host compute device; and means for enumerating, by the MAUSB device, one or more USB devices connected to the MAUSB device.

Example 44 includes the subject matter of Example 43, and wherein the means for sending the indication of the USB configuration data to the host compute device comprises means for sending the USB configuration data to the host compute device.

Example 45 includes the subject matter of any of Examples 43 and 44, and wherein the means for sending the indication of the USB configuration data to the host compute device comprises means for sending a hash of the USB configuration data to the host compute device.

Example 46 includes the subject matter of any of Examples 43-45, and further including means for receiving, by the MAUSB device, a read or write request for one of the one or more USB devices prior to completion of enumerating the one of the one or more USB devices; means for storing, by the MAUSB device, the read or write request until completion of enumerating the one of the one or more USB devices; and means for processing, by the MAUSB device, the read or write request after completion of enumerating the one of the one or more USB devices.

Example 47 includes the subject matter of any of Examples 43-46, and wherein the means for enumerating the one or more USB devices comprises means for enumerating the one or more USB devices without communication with the host compute device regarding enumeration of the one or more USB devices.

Example 48 includes the subject matter of any of Examples 43-47, and wherein the means for sending the indication of USB configuration data stored on the MAUSB device to the host compute device comprises means for sending the configuration data before enumerating the one or more USB devices connected to the MAUSB device.

Example 49 includes the subject matter of any of Examples 43-48, and further including means for determining, by the MAUSB device, that one of the one or more USB devices does not have an entry in the USB configuration data; and means for notifying, by the MAUSB device, the host compute device that the one of the one or more USB devices does not have an entry in the USB configuration data.

Example 50 includes the subject matter of any of Examples 43-49, and further including means for passing, by the MAUSB device, enumeration messages between the one of the one or more USB devices and the host compute device.

Example 51 includes the subject matter of any of Examples 43-50, and further including means for updating, by the MAUSB device, the USB configuration data to include an entry for the one of the one or more USB devices based on the enumeration messages.

Example 52 includes the subject matter of any of Examples 43-51, and further including means for determining, by the MAUSB device, that an entry in the USB configuration data corresponds to a USB device that is not connected to the MAUSB device; means for notifying, by the MAUSB device, the host compute device that the entry corresponds to a USB device that is not connected to the MAUSB device; and means for updating, by the MAUSB device, the USB configuration data to remove the entry.

Example 53 includes a host compute device for enumerating universal serial bus (USB) devices, the host compute device comprising means for establishing, by the host compute device, a media agnostic USB (MAUSB) session with an MAUSB device; means for receiving, by the host compute device an indication of USB configuration data stored on the MAUSB device from the MAUSB device; and means for performing, by the host compute device and based on the USB configuration data, a virtual enumeration of one or more USB devices connected to the MAUSB device.

Example 54 includes the subject matter of Example 53, and wherein the means for receiving the indication of the USB configuration data to the host compute device comprises means for receiving the USB configuration data to the host compute device.

Example 55 includes the subject matter of any of Examples 53 and 54, and wherein the means for receiving the indication of the USB configuration data to the host compute device comprises means for receiving a hash of the USB configuration data to the host compute device.

Example 56 includes the subject matter of any of Examples 53-55, and wherein the means for performing the virtual enumeration of the one or more USB devices comprises means for performing a virtual enumeration of the one or more USB devices without communication with the MAUSB device regarding the enumeration of the one or more USB devices.

Example 57 includes the subject matter of any of Examples 53-56, and further including means for loading device drivers for the one or more USB devices without communication with the MAUSB device regarding enumeration of the one or more USB devices.

Example 58 includes the subject matter of any of Examples 53-57, and further including means for sending a read or write request for one of the one or more USB devices to the MAUSB device without communication with the MAUSB device regarding enumeration of the one of the one or more USB devices.

Example 59 includes the subject matter of any of Examples 53-58, and wherein the means for receiving the indication of the USB configuration data stored on the MAUSB device from the MAUSB device comprises means for receiving the indication of the USB configuration data before performance of the virtual enumeration of the one or more USB devices connected to the MAUSB device.

Example 60 includes the subject matter of any of Examples 53-59, and further including means for receiving USB device addresses of the one or more USB devices; and means for updating local USB device addresses for the one or more USB devices.

Example 61 includes the subject matter of any of Examples 53-60, and further including means for receiving a notification of a USB device that does not have an entry in the USB configuration data; and means for performing enumeration of the USB device that does not have an entry in the USB configuration data.

Example 62 includes the subject matter of any of Examples 53-61, and further including means for updating the USB configuration data based on the enumeration of the USB device that does not have an entry in the USB configuration data.

The invention claimed is:

1. A media agnostic universal serial bus (MAUSB) device for enumerating universal serial bus (USB) devices, the MAUSB device comprising:
an MAUSB session manager to establish an MAUSB session with a host compute device; and
a USB manager to:
send an indication of USB configuration data stored on the MAUSB device to the host compute device, wherein the USB configuration data includes information necessary to perform a virtual enumeration of one or more USB devices connected to the MAUSB device and wherein the USB configuration data is stored on the MAUSB device prior to establishment of the MAUSB session with the host compute device; and
enumerate, by the MAUSB device, the one or more USB devices connected to the MAUSB device.

2. The MAUSB device of claim 1, wherein to send the indication of the USB configuration data to the host compute device comprises to send a hash of the USB configuration data to the host compute device.

3. The MAUSB device of claim 1, wherein the USB manager is further to:
receive a read or write request for one of the one or more USB devices prior to completion of enumeration of the one of the one or more USB devices;
store the read or write request until completion of enumeration of the one of the one or more USB devices; and
process the read or write request after completion of enumeration of the one of the one or more USB devices.

4. The MAUSB device of claim 1, wherein to enumerate the one or more USB devices comprises to send one or more commands to each of the one or more USB devices without receipt of corresponding commands from the host compute device.

5. The MAUSB device of claim 1, wherein to send the indication of USB configuration data stored on the MAUSB device to the host compute device comprises to send the configuration data before initiation of enumeration of the one or more USB devices connected to the MAUSB device.

6. The MAUSB device of claim 1, wherein the USB manager is further to:
determine, during enumeration of the one or more USB devices, that an additional USB device connected to the MAUSB device does not have an entry in the USB configuration data; and
notify the host compute device that the additional USB device does not have an entry in the USB configuration data.

7. The MAUSB device of claim 1, wherein the USB manager is further to:
determine that an entry in the USB configuration data corresponds to a USB device that is not connected to the MAUSB device as of the time of establishment of the MAUSB session;
notify the host compute device that the entry corresponds to a USB device that is not connected to the MAUSB device; and
update the USB configuration data to remove the entry.

8. The MAUSB device of claim 1, wherein to enumerate the one or more USB devices comprises to, for each of the one or more USB devices:
send a request for a device descriptor without receipt of a corresponding request for the device descriptor from the host compute device;
receive the device descriptor in response to the request for the device descriptor;
send a request for a configuration descriptor after receipt of the device descriptor and without receipt of a corresponding request for the configuration descriptor from the host compute device; and
receive the configuration descriptor in response to the request for the configuration descriptor,
wherein the USB configuration data includes, for each of the one or more USB devices, the corresponding device descriptor,
wherein to send the indication of the USB configuration data comprises to send the USB configuration data prior to receipt of the device descriptor from any of the one or more USB devices.

9. The MAUSB device of claim 1, wherein to send the indication of the USB configuration data comprises to send the USB configuration data.

10. The MAUSB device of claim 1, wherein to enumerate the one or more USB devices comprises to assign an address to each of the one or more USB devices without receipt of address assignments from the host compute device,
  wherein the USB manager is further to send the assigned addresses of the one or more USB devices to the host compute device.

11. A host compute device for enumerating universal serial bus (USB) devices, the host compute device comprising:
  an MAUSB session manager to establish a media agnostic USB (MAUSB) session with an MAUSB device; and
  a USB manager to:
    receive an indication of USB configuration data stored on the MAUSB device from the MAUSB device;
    perform, based on the USB configuration data, a virtual enumeration of one or more USB devices connected to the MAUSB device;
    receive USB device addresses of the one or more USB devices; and
    update local USB device addresses for the one or more USB devices.

12. The host compute device of claim 11,
  wherein the USB configuration data includes information necessary to perform a virtual enumeration of the one or more USB devices connected to the MAUSB device,
  wherein the USB configuration data is stored on the MAUSB device prior to establishment of the MAUSB session with the MAUSB device,
  wherein to receive the indication of the USB configuration data from the MAUSB device comprises to receive a hash of the USB configuration data from the MAUSB device.

13. The host compute device of claim 11, wherein to perform the virtual enumeration of the one or more USB devices comprises to perform a virtual enumeration of the one or more USB devices without communication with the MAUSB device regarding the enumeration of the one or more USB devices.

14. The host compute device of claim 11, wherein the USB manager is further to load device drivers for the one or more USB devices without communication with the MAUSB device regarding enumeration of the one or more USB devices.

15. The host compute device of claim 11, wherein the USB manager is further to assign each of the one or more USB devices a corresponding initial USB device address as part of the virtual enumeration of the one or more USB devices,
  wherein to update the local USB device addresses for the one or more USB devices comprises to update the local USB device addresses from the initial USB device addresses assigned as part of the virtual enumeration.

16. The host compute device of claim 11, wherein the USB manager is further to send a read or write request for one of the one or more USB devices prior to receipt of an indication from the MAUSB device that enumeration of the one or more USB devices is complete.

17. One or more non-transitory computer-readable media comprising a plurality of instructions stored thereon that, when executed, causes a media agnostic universal serial bus (MAUSB) device to:
  establish an MAUSB session with a host compute device; and
  send an indication of universal serial bus (USB) configuration data stored on the MAUSB device to the host compute device, wherein the USB configuration data includes information necessary to perform a virtual enumeration of one or more USB devices connected to the MAUSB device and wherein the USB configuration data is stored on the MAUSB device prior to establishment of the MAUSB session with the host compute device; and
  enumerate the one or more USB devices connected to the MAUSB device.

18. The one or more non-transitory computer-readable media of claim 17, wherein to send the indication of the USB configuration data to the host compute device comprises to send a hash of the USB configuration data to the host compute device.

19. The one or more non-transitory computer-readable media of claim 17, wherein the plurality of instructions further causes the MAUSB device to:
  receive a read or write request for one of the one or more USB devices prior to completion of enumeration of the one of the one or more USB devices;
  store the read or write request until completion of enumeration of the one of the one or more USB devices; and
  process the read or write request after completion of enumeration of the one of the one or more USB devices.

20. The one or more non-transitory computer-readable media of claim 17, wherein to enumerate the one or more USB devices comprises to enumerate the one or more USB devices without communication with the host compute device regarding enumeration of the one or more USB devices.

21. The one or more non-transitory computer-readable media of claim 17, wherein the plurality of instructions further causes the MAUSB device to:
  determine, during enumeration of the one or more USB devices, an additional USB device connected to the MAUSB device does not have an entry in the USB configuration data; and
  notify the host compute device that the additional USB device does not have an entry in the USB configuration data.

22. One or more non-transitory computer-readable media comprising a plurality of instructions stored thereon that, when executed, causes a host compute device to:
  establish a media agnostic universal serial bus (MAUSB) session with an MAUSB device;
  receive an indication of universal serial bus (USB) configuration data stored on the MAUSB device from the MAUSB device;
  perform, based on the USB configuration data, a virtual enumeration of one or more USB devices connected to the MAUSB device;
  receive USB device addresses of the one or more USB devices; and
  update local USB device addresses for the one or more USB devices.

23. The one or more non-transitory computer-readable media of claim 22,
  wherein the USB configuration data includes information necessary to perform a virtual enumeration of the one or more USB devices connected to the MAUSB device,
  wherein the USB configuration data is stored on the MAUSB device prior to establishment of the MAUSB session with the MAUSB device wherein to receive the indication of the USB configuration data from the MAUSB device comprises to receive a hash of the USB configuration data from the MAUSB device.

24. The one or more non-transitory computer-readable media of claim 22, wherein to perform the virtual enumeration of the one or more USB devices comprises to perform a virtual enumeration of the one or more USB devices without communication with the MAUSB device regarding the enumeration of the one or more USB devices.

25. The one or more non-transitory computer-readable media of claim 22, wherein the plurality of instructions further causes the host compute device to load device drivers for the one or more USB devices without communication with the MAUSB device regarding enumeration of the one or more USB devices.

26. A method for enumerating universal serial bus (USB) devices, the method comprising:

establishing, by a media agnostic USB (MAUSB) device, an MAUSB session with a host compute device;

sending, by the MAUSB device, an indication of USB configuration data stored on the MAUSB device to the host compute device, wherein the USB configuration data includes information necessary to perform a virtual enumeration of one or more USB devices connected to the MAUSB device and wherein the USB configuration data is stored on the MAUSB device prior to establishment of the MAUSB session with the host compute device; and enumerating, by the MAUSB device, the one or more USB devices connected to the MAUSB device.

27. The method of claim 26, wherein enumerating the one or more USB devices comprises enumerating the one or more USB devices without communication with the host compute device regarding enumeration of the one or more USB devices.

28. The method of claim 26, wherein sending the indication of USB configuration data stored on the MAUSB device to the host compute device comprises sending the configuration data before beginning enumerating the one or more USB devices connected to the MAUSB device.

* * * * *